United States Patent
Liang et al.

(10) Patent No.: US 10,013,503 B2
(45) Date of Patent: Jul. 3, 2018

(54) CANVAS ELEMENT RENDERING METHOD AND APPARATUS IMPLEMENTED ON ANDROID SYSTEM BASED ON GPU

(71) Applicant: GUANGZHOU UCWEB COMPUTER TECHNOLOGY CO., LTD., Guangzhou (CN)

(72) Inventors: Jie Liang, Guangzhou (CN); Xuxin Yi, Guangzhou (CN)

(73) Assignee: GUANGZHOU UCWEB COMPUTER TECNOLOGY CO., LTD., Guangzhou (CN)

( * ) Notice: Subject to any disclaimer, the term of this patent is extended or adjusted under 35 U.S.C. 154(b) by 227 days.

(21) Appl. No.: 14/901,431

(22) PCT Filed: Nov. 22, 2013

(86) PCT No.: PCT/CN2013/087693
§ 371 (c)(1),
(2) Date: Dec. 28, 2015

(87) PCT Pub. No.: WO2014/205993
PCT Pub. Date: Dec. 31, 2014

(65) Prior Publication Data
US 2016/0328486 A1   Nov. 10, 2016

(30) Foreign Application Priority Data
Jun. 28, 2013  (CN) .......................... 2013 1 0266070

(51) Int. Cl.
*G06F 13/14*   (2006.01)
*G06F 17/30*   (2006.01)
(Continued)

(52) U.S. Cl.
CPC .... *G06F 17/30905* (2013.01); *G06F 17/2247* (2013.01); *G06F 17/30899* (2013.01); *G06T 1/20* (2013.01)

(58) Field of Classification Search
CPC ............ G06T 1/20; G06T 15/00; G06T 11/00
See application file for complete search history.

(56) References Cited

U.S. PATENT DOCUMENTS

| | | | |
|---|---|---|---|
| 2010/0085367 A1* | 4/2010 | Jeong | G06T 11/203 345/520 |
| 2012/0113091 A1* | 5/2012 | Isaacson | G06T 1/20 345/418 |

FOREIGN PATENT DOCUMENTS

| | | |
|---|---|---|
| CN | 102681853 | 9/2012 |
| CN | 103092612 A | 5/2013 |

(Continued)

OTHER PUBLICATIONS

PCT International Search Report dated Apr. 3, 2014, issued in corresponding International Application No. PCT/CN2013/087693 (5 pages).

(Continued)

*Primary Examiner* — Weiming He

(57) ABSTRACT

Embodiments of the disclosure are directed to HTML5 Canvas element rendering methods implemented on an Android system based on GPU hardware. The methods may include after a rendering operation instruction for a Canvas element in an HTML5 web page is detected and an initialization operation is completed, converting an invoking instruction for a 2D Canvas drawing API into an invoking instruction for an OpenGL ES API through a Skia GPU function library; setting EGL Context created during the initialization operation as a current context of a thread where a rendering operation is located; rendering the Canvas element in an off-screen local window created during the (Continued)

initialization operation by using the GPU; and copying the rendered Canvas element to a current active window of a device from the off-screen local window by using a mapping operation function of the GPU. The methods, by making use of a local window rendering mechanism provided by an Android operating system and the OpenGL ES API, allow the Canvas element to be drawn and mixed by using the GPU, thereby improving the performance of Canvas rendering by using GPU hardware acceleration.

20 Claims, 9 Drawing Sheets

(51) Int. Cl.
    *G06F 17/22*     (2006.01)
    *G06T 1/20*     (2006.01)

(56) References Cited

FOREIGN PATENT DOCUMENTS

| | | |
|---|---|---|
| CN | 103116490 | 5/2013 |
| CN | 103336816 A | 10/2013 |
| JP | 2013-41500 A | 2/2013 |
| TW | 200948088 A | 11/2009 |

OTHER PUBLICATIONS

First Notice issued by China State Intellectual Property Office, dated Dec. 25, 2015 for Chinese Patent Application No. 201310266070.7 with search report.

Notification to Grant Patent Right for Invention issued by China State Intellectual Property Office, dated Aug. 30, 2016 for Chinese Patent Application No. 201310266070.7.

PCT Written Opinion dated Apr. 3, 2014, issued in corresponding International Application No. PCT/CN2013/087693 (10 pages).

\* cited by examiner

CANVAS ELEMENT RENDERING METHOD AND APPARATUS IMPLEMENTED ON ANDROID SYSTEM BASED ON GPU

CROSS-REFERENCE TO RELATED APPLICATION

This is a national stage application of International Application No. PCT/CN2013/087693, filed on Nov. 22, 2013, which claims priority to and benefits of Chinese Patent Application No. 201310266070.7, filed on Jun. 28, 2013. The contents of both of the above-referenced applications are incorporated herein by reference in their entirety.

TECHNICAL FIELD

The present disclosure relates to the field of web page rendering, and more particularly to Canvas element rendering methods and apparatus implemented on an Android system based on GPU hardware.

BACKGROUND

In two-dimensional (2D) Canvas specifications of an HTML5 technology, a set of 2D Canvas drawing Application Programming Interfaces (APIs) are defined. By using these APIs, 2D graphic drawing in an immediate mode can be carried out on a web page. As described herein, Canvas may refer to a canvas or a drawable area on a web page that contains various drawing elements. If the web page contains a Canvas element, it is feasible to use various 2D Canvas drawing APIs to draw what a user wants within an area covered by the canvas element through JavaScript codes.

The English full name of GPU is Graphics Processing Unit, and the Chinese translation thereof is "Tu Xing Chu Li Dan Yuan". GPU is a concept relative to Central Processing Unit (CPU). GPU is the "brain" of a display card. It determines most performances of the display card and is also a basis for distinguishing a 2D display card or chip from a three-dimensional (3D) display card or chip. A 2D display chip mainly relies on the processing capability of a CPU in processing 3D images and special effects, which is called "software acceleration". A 3D display chip integrates functions of processing 3D images and special effects into the display chip, i.e., the so-called "hardware acceleration" function.

In implementation of the existing browser, invocation of JavaScript codes for a 2D Canvas drawing API is mapped to a platform-related 2D drawing library. An off-screen bitmap is drawn in the 2D drawing library (this step is usually called the drawing step), and then the bitmap is copied to a visible window of a current program (this step is usually called the mixing step). A defect of such a manner lies in that, whether it is the drawing step or the mixing step, the completion of the step relies on a CPU, which results in a low drawing efficiency, and does not allow a sufficient use of the GPU for hardware acceleration.

SUMMARY OF THE DISCLOSURE

In view of the above, embodiments of the present disclosure provide methods and apparatuses for rendering a HTML5 Canvas element. The methods and apparatuses are implemented on an Android system based on GPU hardware. The methods and apparatuses, by making use of a local window rendering mechanism provided by an Android operating system and an OpenGL ES API, complete drawing and mixing of a Canvas element by using a GPU, thereby improving the performance of Canvas rendering by using the GPU hardware acceleration.

In one aspect, the present disclosure provides an HTML5 Canvas element rendering method implemented on an Android system based on GPU hardware. The method may include: performing an initialization operation for a Canvas element, the initialization operation including: creating an off-screen local window for the Canvas element based on attribute information of the Canvas element; and creating an EGL Window Surface and an EGL Context based on the off-screen local window; after a rendering operation instruction for a Canvas element in an HTML5 web page is detected and the initialization operation is completed, converting an invoking instruction for a 2D Canvas drawing API into an invoking instruction for an OpenGL ES API through a Skia GPU function library; setting the EGL Context created during the initialization operation as a current context of a thread where the rendering operation is located; rendering the Canvas element in the off-screen local window created during the initialization operation by using the GPU in accordance with the attribute information of the Canvas element; and copying the rendered Canvas element to a current active window of a device from the off-screen local window by using a mapping operation function of the GPU.

In one or more embodiments of the foregoing aspect, converting an invoking instruction for a 2D Canvas drawing API into an invoking instruction for an OpenGL ES API through a Skia GPU function library may include: packaging the EGL Window Surface created in the off-screen local window as a SkGpuDevice; creating a SkCanvas based on the SkGpuDevice; and converting an invoking instruction for a 2D Canvas drawing API into an invoking instruction for an OpenGL ES API by using the SkCanvas.

In one or more embodiments of the foregoing aspect, copying the rendered Canvas element to a current active window of a device from the off-screen local window by using a mapping operation function of the GPU may include: after rendering of the Canvas element in the off-screen local window is completed, binding the off-screen local window to OpenGL mapping; and copying the off-screen local window to the current active window of the device through a mapping operation.

In one or more embodiments of the foregoing aspect, after a window update request is received, the off-screen local window is bound to the OpenGL mapping, and the window update request is sent after a browser rendering engine detects that web page content changes.

In one or more embodiments of the foregoing aspect, the attribute information of the Canvas element is acquired from a rendering engine, and the attribute information at least includes the size and position of the Canvas element.

In one or more embodiments of the foregoing aspect, before converting an invoking instruction for a 2D Canvas drawing API into an invoking instruction for an OpenGL ES API through a Skia GPU function library, the methods may further include: after the rendering operation instruction for a Canvas element in an HTML5 web page is detected, checking whether the initialization operation has been completed for the Canvas element; and when the initialization operation has not been completed, executing the initialization operation for the Canvas element.

In another aspect, the present disclosure provides a Canvas element rendering apparatus for implementing HTML5 Canvas element rendering on an Android system based on GPU hardware. The apparatus may include: an initialization unit, which may create an off-screen local window for a Canvas element based on attribute information of the Canvas element, and may create an EGL Window Surface and an EGL Context based on the off-screen local window; a conversion unit, which may, after a rendering operation instruction for a Canvas element in an HTML5 web page is detected and the initialization unit completes an initialization operation, convert an invoking instruction for a 2D Canvas drawing API into an invoking instruction for an OpenGL ES API through a Skia GPU function library; a setting unit, which may set the EGL Context created during the initialization operation as a current context of a thread where the rendering operation is located; a rendering unit, which may render the Canvas element in the off-screen local window created during the initialization operation by using the GPU in accordance with the attribute information of the Canvas element; and a copying unit, which may copy the rendered Canvas element to a current active window of a device from the off-screen local window by using a mapping operation function of the GPU.

In one or more embodiments of the foregoing aspect, the conversion unit may include: a packaging module, which may package the EGL Window Surface created in the off-screen local window as a SkGpuDevice; a creation module, which may create a SkCanvas based on the SkGpuDevice; and a conversion module, which may convert an invoking instruction for a 2D Canvas drawing API into an invoking instruction for an OpenGL ES API by using the SkCanvas.

In one or more embodiments of the foregoing aspect, the copying unit may include: a binding module, which may, after rendering of the Canvas element in the off-screen local window is completed, bind the off-screen local window to OpenGL mapping; and a mapping module, which may copy the off-screen local window to the current active window of the device through a mapping operation.

In one or more embodiments of the foregoing aspect, the binding module is configured to, after a window update request is received, bind the off-screen local window to the OpenGL mapping, the window update request being sent after a browser rendering engine detects that web page content changes.

In one or more embodiments of the foregoing aspect, the Canvas element rendering apparatus may further include: a checking unit, which may, after the rendering operation instruction for a Canvas element in an HTML5 web page is detected, check whether the initialization operation has been completed for the Canvas element; in which, when the initialization operation has not been completed, the initialization unit executes the initialization operation for the Canvas element.

In another aspect, the present disclosure further provides a mobile terminal including the Canvas element rendering apparatus.

In another aspect, the present disclosure further provides a computer-readable medium having processor-executable program codes. The program codes cause a processor to execute the following steps of:

performing an initialization operation for a Canvas element, the initialization operation including: creating an off-screen local window for the Canvas element based on attribute information of the Canvas element; and creating an EGL Window Surface and an EGL Context based on the off-screen local window;

after a rendering operation instruction for a Canvas element in an HTML5 web page is detected and the initialization operation is completed, converting an invoking instruction for a 2D Canvas drawing API into an invoking instruction for an OpenGL ES API through a Skia GPU function library;

setting the EGL Context created during the initialization operation as a current context of a thread where the rendering operation is located;

rendering the Canvas element in the off-screen local window created during the initialization operation by using the GPU in accordance with the attribute information of the Canvas element; and copying the rendered Canvas element to a current active window of a device from the off-screen local window by using a mapping operation function of the GPU.

The methods and apparatuses, by making use of a local window rendering mechanism provided by an Android operating system and an OpenGL ES API, allow completing drawing and mixing of a Canvas element by using a GPU, thereby improving the performance of Canvas rendering by using GPU hardware acceleration.

In order to achieve the aforementioned and related objectives, one or more aspects of the present disclosure include features that will be described in detail hereinafter and particularly pointed out in the claims. The following description and the accompanying drawings describe some exemplary aspects of the present disclosure in detail. However, these aspects indicate exemplary embodiments in various manners that can use the principle of the present disclosure. In addition, the present disclosure is intended to include all these aspects and their equivalents.

BRIEF DESCRIPTION OF THE DRAWINGS

The aforementioned and other objectives, features, and advantages of the present disclosure will become more apparent from the following detailed description with reference to the accompanying drawings. In the drawings.

The same reference numbers in all the accompanying drawings refer to same, similar, or corresponding features or functions.

DETAILED DESCRIPTION

Figure 1:
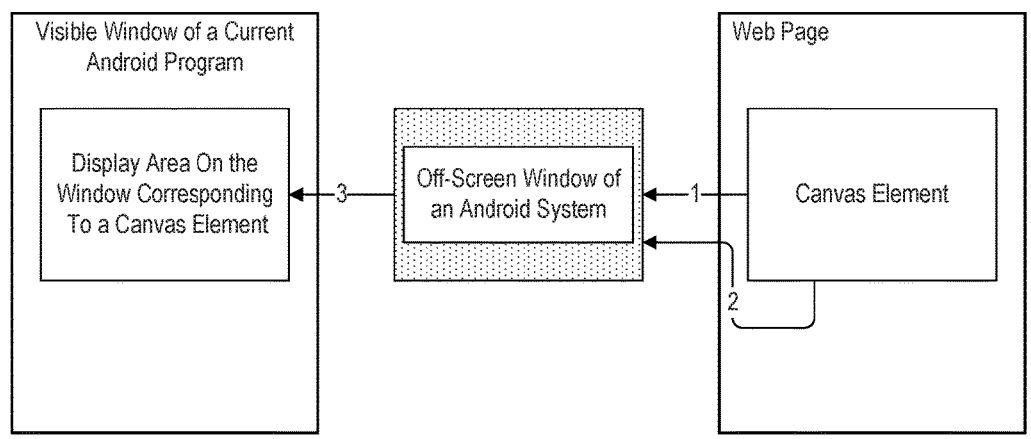
FIG. 1 is a schematic diagram illustrating a process of a Canvas element rendering method, according to an embodiment the present disclosure.

Various aspects of the present disclosure are described below. It should be understood that the teaching herein may be specifically embodied in a variety of forms, and any specific structure, function, or both disclosed herein are only representative. Based on the teaching herein, those skilled in the art should understand that one aspect disclosed herein may be implemented independently of any other aspects, and two or more aspects in the aspects can be combined in various manners. For example, an apparatus or a method can be implemented or practiced by using any number of aspects elaborated herein. In addition, such an apparatus or a method can be implemented or practiced by using other structures, functions, or structures and functions other than the one or more aspects elaborated herein. Besides, any aspect described herein may include at least one element of the claims.

The technical solution involved in the present disclosure is an implementation scheme for rendering a 2D Canvas element in an HTML5 web page by using GPU hardware acceleration on an Android operating system or platform. It can make use of a local window rendering mechanism provided by an Android operating system and cross-platform OpenGL ES API, and complete drawing and mixing of the Canvas element by using the GPU, thereby improving the performance of Canvas rendering by using hardware acceleration.

Prior to the description of the embodiments of the present disclosure, some terms involved in the present disclosure are described herein at first.

The term "OpenGL ES (OpenGL for Embedded Systems)" may refer to a subset of OpenGL 3D graphics APIs, which is designed for embedded devices, such as mobile phones, personal digital assistance (PDAs), and game consoles.

The term "OpenGL (Open Graphics Library)" may refer to a professional graphics programming interface, and is an underlying graphics library that has powerful functions and is easy to invoke.

The term "EGL" may refer to an interface between OpenGL ES and a local window system of an underlying operating system, and is designed to provide platform independence for OpenGL ES. In the EGL, Display is an abstract representation of a graphics display device (e.g., display screen), and most EGL functions have Display as a parameter. Context is an OpenGL state machine, and Surface is a drawing buffer. Context and Surface may be in a one-to-one, many-to-one, or one-to-many relationship. Context may be one of the three types: window, pbuffer, or pixmap.

Skia is a 2D vector graphics drawing function library, including drawing functions for Text, Bitmap, and Shape, and other drawing functions, and the implementation thereof is concise and efficient. Not only the Google Chrome browser uses Skia, but also the emerging Android open mobile phone platform uses Skia for drawing processing. Skia can be adapted to backend implementation based on different hardware, with default implementation using CPU and optional implementation using GPU for drawing. For example, Skia may be implemented using GPU for drawing by converting an invocation of 2D drawing API into an invocation of an OpenGL/OpenGL ES 3D API.

Various embodiments of the present disclosure are described below with reference to the accompanying drawings.

FIG. 1 is a schematic diagram illustrating a process of a Canvas element rendering method, according to an embodiment the present disclosure. As shown in FIG. 1, in the Canvas element rendering method, for a 2D Canvas element in an HTML5 web page, at first, drawing is carried out in an off-screen local window of an Android system, and after the drawing is completed, the 2D Canvas element is copied to a visible window of a current Android program.

Figure 2:
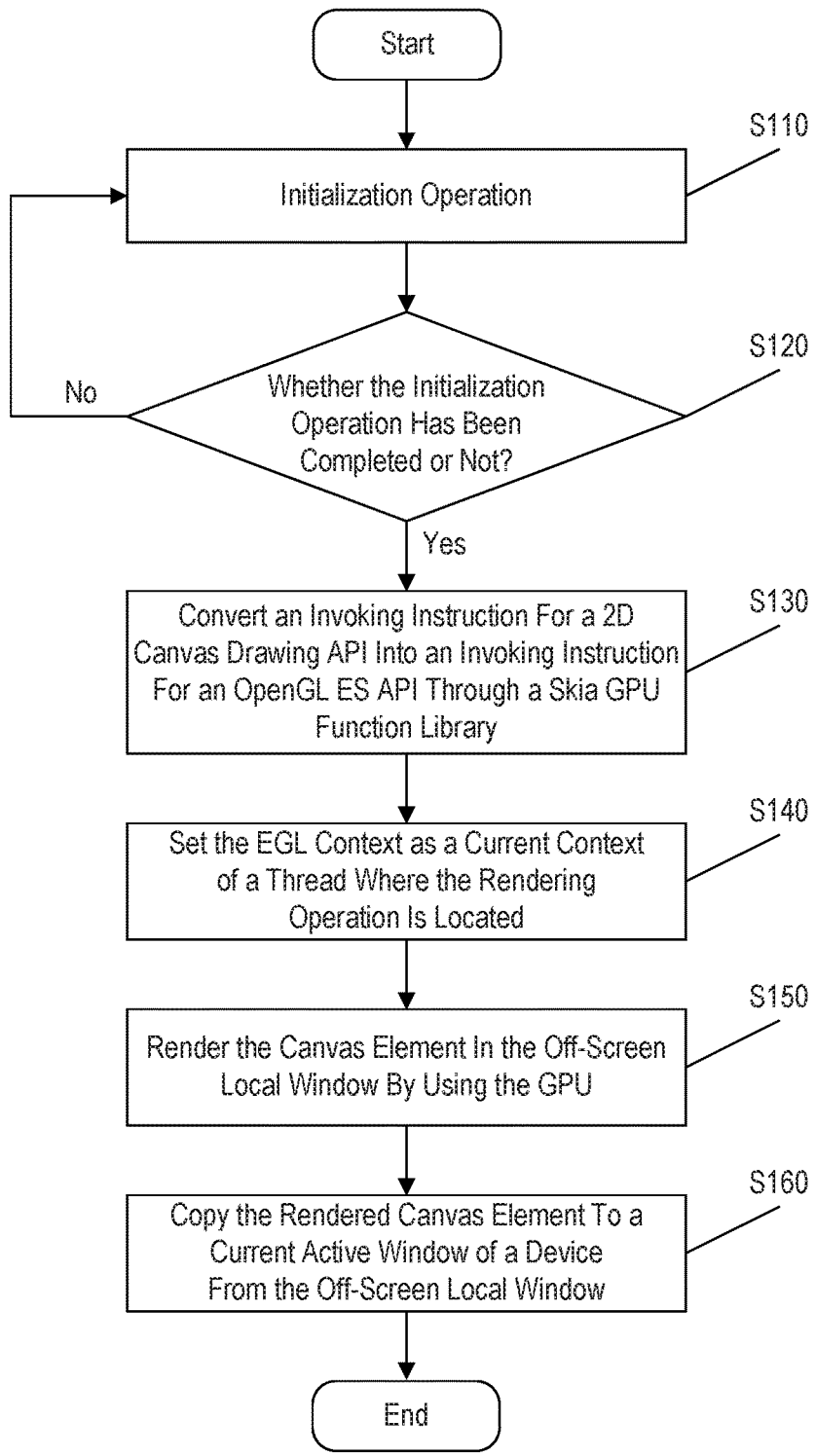
FIG. 2 is a flow chart illustrating an HTML5 Canvas element rendering method implemented on an Android system based on GPU hardware, according to an embodiment of the present disclosure.

FIG. 2 is a flow chart illustrating an HTML5 Canvas element rendering method implemented on an Android system based on GPU hardware, according to an embodiment of the present disclosure.

As shown in FIG. 2, first of all, after an operation instruction for rendering a Canvas element in an HTML5 web page is detected, step S110 is performed, in which an initialization operation is performed for the Canvas element. Then, step S120 is performed, in which whether the initialization operation has been completed for the Canvas element is checked. If the initialization operation has not been completed, the process goes back to step S110. If the initialization operation has been completed, the process proceeds to step S130.

Figure 3:
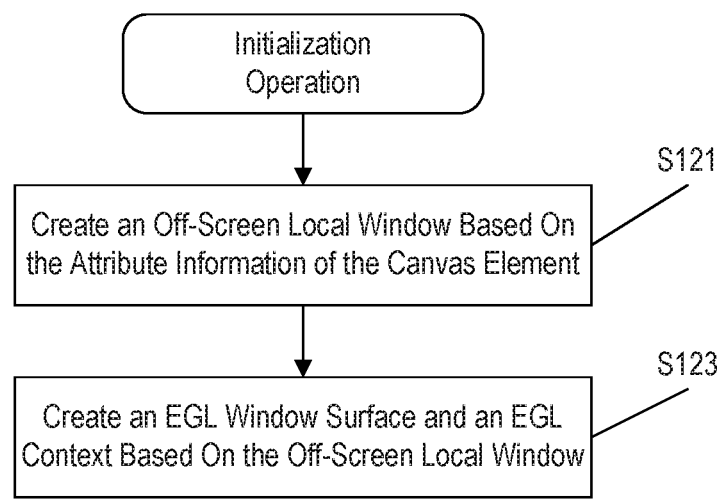
FIG. 3 is a flow chart illustrating an example of the initialization operation of FIG. 2.

FIG. 3 is a flow chart illustrating an example of the initialization operation, as shown in FIG. 2. As shown in FIG. 3, first of all, in step S121, an off-screen local window is created for the Canvas element based on attribute information of the Canvas element. The attribute information of the Canvas element is acquired from a rendering engine, and the attribute information at least includes the size and position of the Canvas element. After the attribute information of the Canvas element is acquired, the off-screen local window is created according to the size of the Canvas element. As described herein, the off-screen local window refers to a local window created by an operating system, but a window mixer of the operating system will not draw the off-screen local window on a display screen when carrying out window mixing, that is to say, the off-screen local window does not directly participate in window mixing of the operating system per se, and is invisible for the operating system.

Next, in step S123, an EGL Window Surface and an EGL Context are created based on the off-screen local window. For example, after a system API is invoked to create the off-screen local window, a handle of the local window of the operating system is obtained, and then the EGL Window Surface and the EGL Context are created by using the handle. In addition, after the EGL Context is created, if it needs to be effective on a certain Window Surface, the EGL Context is bound to the Window Surface when the EGL Context is set as a current Context of a current thread (invoked through an eglMakeCurrent API). After the EGL Context is bound to the created Window Surface, a GL command executed on the EGL Context will be drawn on the Window Surface bound thereto.

Figure 4:
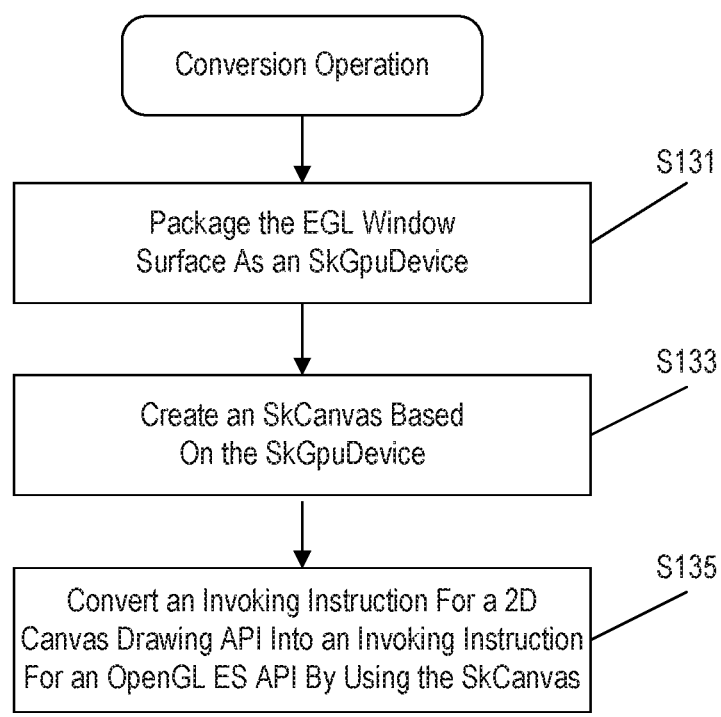
FIG. 4 is a flow chart illustrating an example of converting an invoking instruction for a 2D Canvas drawing API into an invoking instruction for an OpenGL ES API of FIG. 2.

After the initialization operation is completed as described above, in step S130, an invoking instruction for a 2D Canvas drawing API is converted into an invoking instruction for an OpenGL ES API through a Skia GPU function library. FIG. 4 is a flow chart illustrating an example of converting an invoking instruction for a 2D Canvas drawing API into an invoking instruction for an OpenGL ES API through a Skia GPU function library.

As shown in FIG. 4, after the initialization operation is completed, in step S131, the EGL Window Surface created in the off-screen local window is packaged as a SkGpuDevice. Then, in step S133, a SkCanvas based on the SkGpuDevice is created. Next, in step S135, an invoking instruction for a 2D Canvas drawing API is converted into an invoking instruction for an OpenGL ES API by using the SkCanvas. For example, the created SkCanvas is available for 2D drawing, and then via the SkGpuDevice, an invoking instruction for a 2D Canvas drawing API (i.e., a 2D drawing instruction) is converted into an invoking instruction for an OpenGL ES API (i.e., 3D GL instruction).

Then, in step S140, the EGL Context is set as a current context of a thread where the rendering operation is located (i.e., a drawing thread used for rendering the Canvas element).

Next, in step S150, the drawing thread renders the Canvas element in the off-screen local window by using the GPU in accordance with the attribute information of the Canvas element (e.g., position information of the Canvas element).

After rendering of the Canvas element is completed, in step S160, a mixing thread copies the rendered Canvas element to a current active window of a device (e.g., a visible window of a current Android program) from the off-screen local window by using a mapping operation function of the GPU.

Figure 5:
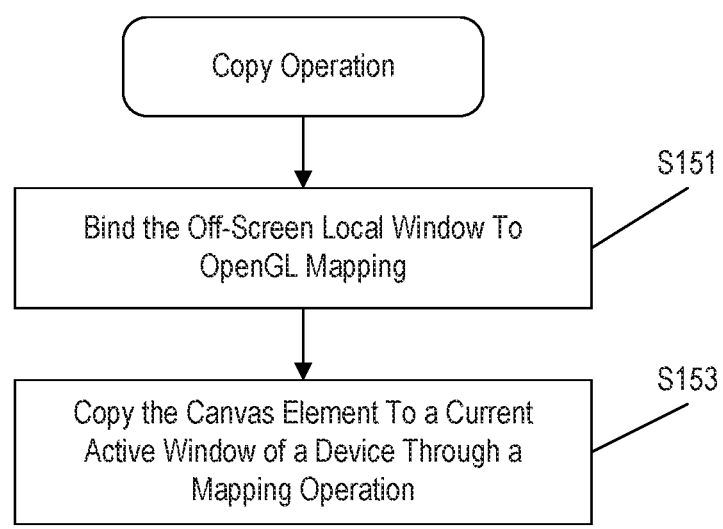
FIG. 5 is a flow chart illustrating an example of copying the rendered Canvas element to a current active window of a device from the off-screen local window of FIG. 2.

FIG. 5 is a flow chart illustrating an example of copying the rendered Canvas element to a current active window of a device from the off-screen local window, as shown in FIG. 2.

As shown in FIG. 5, after rendering of the Canvas element in the off-screen local window is completed, in step S151, the off-screen local window is bound to OpenGL mapping. Then, in step S153, the off-screen local window is copied to the current active window of the device (e.g., the visible window of the current Android program) through a mapping operation, thus achieving the Canvas element rendering according to the present disclosure.

In one example of the present disclosure, binding the off-screen local window to OpenGL mapping is performed after a window update request is received. The window update request may be sent after a browser rendering engine detects that web page content changes. For example, when a JavaScript code invokes a 2D drawing instruction of Canvas, a rendering engine will consider that content of the Canvas element in the web page changes, so as to send a new window update request.

As described herein, the embodiment as shown in FIG. 2 is merely an exemplary embodiment of the present disclosure, and various modifications can be made to the aforementioned embodiments. The modified embodiments fall within the scope of the present disclosure. For example, in other embodiments of the present disclosure, step S110 of FIG. 2 may be deleted. Alternatively, prior to step S110, a step of detecting a rendering operation instruction for the Canvas element in the HTML5 web page may be added.

The HTML5 Canvas element rendering methods implemented on an Android system based on GPU hardware according to the present disclosure has been described as above with reference to FIG. 1 to FIG. 5. The Canvas element rendering methods according to the present disclosure may be implemented by using software, may be implemented by using hardware, or may be implemented by using a combination of software and hardware.

Figure 6:
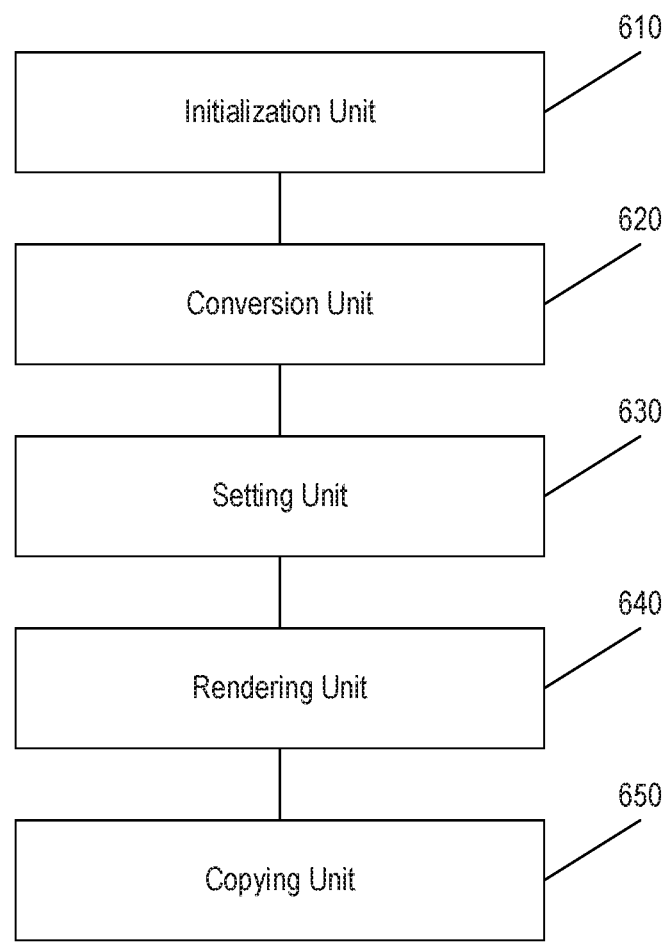
FIG. 6 is a schematic block diagram illustrating an exemplary apparatus for implementing HTML5 Canvas element rendering on an Android system based on GPU hardware, according to an embodiment of the present disclosure.

FIG. 6 is a schematic block diagram illustrating an exemplary Canvas element rendering apparatus 600 for rendering a HTML5 Canvas element on an Android system based on GPU hardware, according to an embodiment of the present disclosure.

As shown in FIG. 6, the Canvas element rendering apparatus 600 includes an initialization unit 610, a conversion unit 620, a setting unit 630, a rendering unit, 640 and a copying unit 650.

Initialization unit 610 may create an off-screen local window for a Canvas element based on attribute information of the Canvas element, and may create an EGL Window Surface and an EGL Context based on the off-screen local window. The attribute information of the Canvas element is acquired from a rendering engine, and the attribute information at least includes the size and position of the Canvas element. After the attribute information of the Canvas element is acquired, the off-screen local window is created according to the size of the Canvas element.

After a rendering operation instruction for a Canvas element in an HTML5 web page is detected and initialization unit 610 completes the initialization operation, conversion unit 620 may convert an invoking instruction for a 2D Canvas drawing API into an invoking instruction for an OpenGL ES API through a Skia GPU function library.

Figure 7:
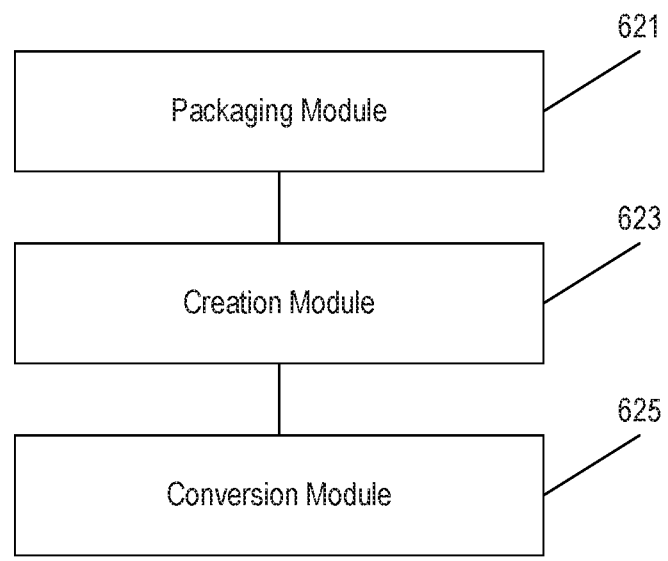
FIG. 7 is a schematic block diagram illustrating an example of the conversion unit of FIG. 6.

FIG. 7 is a schematic block diagram illustrating an example of conversion unit 620, as shown in FIG. 6. As shown in FIG. 7, conversion unit 620 includes a packaging module 621, a creation module 623, and a conversion module 625. Packaging module 621 packages the EGL Windows Surface created in the off-screen local window as a SkGpuDevice. Creation module 623 creates a SkCanvas based on the SkGpuDevice. Conversion module 625 converts an invoking instruction for a 2D Canvas drawing API into an invoking instruction for an OpenGL ES API by using the SkCanvas.

Setting unit 630 sets the EGL Context created during the initialization operation as a current context of a thread where the rendering operation is located. As described herein, the thread where the rendering operation is located refers to a drawing thread used for rendering the Canvas element.

Rendering unit 640 renders the Canvas element in the off-screen local window created during the initialization operation by using the GPU in accordance with the attribute information of the Canvas element, for example, the position information of the Canvas element in the HTML5 web page.

After rendering of the Canvas element is completed as described above, copying unit 650 copies the rendered Canvas element to a current active window of a device from the off-screen local window by using a mapping operation function of the GPU.

Figure 8:
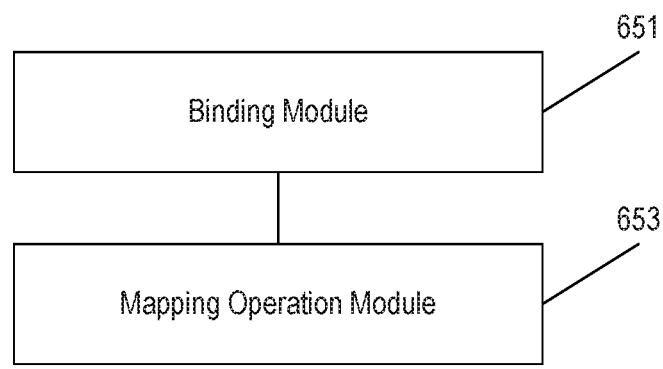
FIG. 8 is a schematic block diagram illustrating an example of the copying unit of FIG. 6.

FIG. 8 is a schematic block diagram illustrating an example of copying unit 650, as shown in FIG. 6. As shown in FIG. 8, copying unit 650 includes a binding module 651 and a mapping module 653.

After rendering of the Canvas element in the off-screen local window is completed, binding module 651 binds the off-screen local window to OpenGL mapping. Then, mapping module 653 copies the off-screen local window to a current active window of a device through a mapping operation.

In one example of the present disclosure, binding module 651 is configured to, after a window update request is received, bind the off-screen local window to OpenGL mapping, the window update request being sent after a browser rendering engine detects that the web page content changes.

In addition, in another example of the present disclosure, Canvas element rendering apparatus 600 may further include a checking unit (not shown), which, after the rendering operation instruction for a Canvas element in an HTML5 web page is detected, checks whether the initialization operation has been completed for the Canvas element; in which, when the initialization operation has not been completed, initialization unit 610 executes the initialization operation for the Canvas element.

In addition, in a further example of the present disclosure, Canvas element rendering apparatus 600 may further include a detection unit (not shown), that detects whether there is a rendering operation instruction for the Canvas element in the HTML5 web page.

The methods and apparatuses described above, by making use of a local window rendering mechanism provided by an Android operating system and an OpenGL ES API, complete drawing and mixing of a Canvas element by using a GPU, thereby improving the performance of Canvas rendering by using GPU hardware acceleration.

Figure 9:
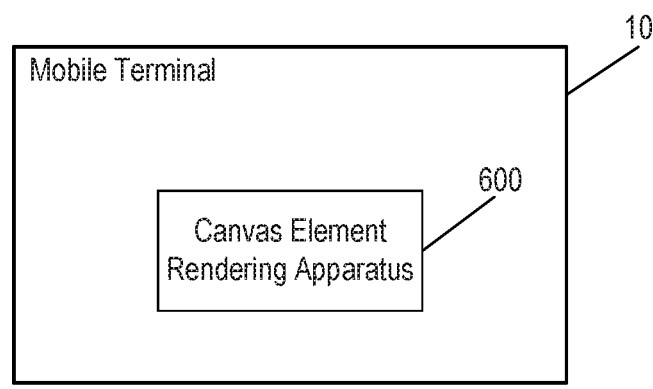
FIG. 9 is a schematic block diagram illustrating an exemplary mobile terminal having the Canvas element rendering apparatus of FIG. 6.

FIG. 9 is a schematic block diagram illustrating an exemplary mobile terminal 10 having Canvas element rendering apparatus 600, according to the embodiments of the present disclosure. As shown in FIG. 9, mobile terminal 10 includes Canvas element rendering apparatus 600 as shown in FIG. 6. As described herein, Canvas element rendering apparatus 600 as shown in FIG. 9 may include any variation of Canvas element rendering apparatus 600 shown in FIG. 6.

In addition, the mobile terminal according to the present disclosure may be any variation of a smart mobile terminal, for example, smartphones.

In addition, the methods according to the present disclosure may be implemented as a computer program that is executed by a processor (for example, a CPU) in the mobile terminal, and is stored in a memory of the mobile terminal. When the computer program is executed by the processor, the functions or steps defined in the methods of the present disclosure are executed.

In addition, the methods according to the present disclosure may also be implemented as a product containing a computer program, in which the product includes a computer-readable medium, and a computer program used for executing the functions or steps defined in the methods of the present disclosure and stored on the computer-readable medium.

In addition, the method steps and system units may also be implemented by making use of a controller and a computer-readable storage device that stores a computer program that causes the controller to implement the steps or functions of the units.

Those skilled in the art should also understand that various exemplary logic blocks, modules, circuits, and algorithm steps in combination with the disclosure herein can be implemented as electronic hardware, computer software, or a combination thereof. In order to clearly describe such interchangeability of hardware and software, general description has been provided for the functions of various schematic components, blocks, modules, circuits, and steps. Whether such functions are implemented as software or hardware depends on specific applications and design constraints applied to the whole system. Those skilled in the art can implement the functions in various manners for each specific application, but such a decision of implementation should not be construed as departing from the scope of the present disclosure.

Although the contents disclosed previously illustrate exemplary embodiments of the present disclosure, it should be noted that various changes and modifications can be made on the premise of not departing from the scope of the present disclosure defined by the claims. Functions, steps, and/or actions of process claims according to the embodiments described herein do not need to be executed in any specific order. In addition, although elements of the present disclosure may be described or used in individual forms, they may also be used in combinations, unless the number thereof is explicitly limited as a singular number.

Although various embodiments according to the present disclosure have been described as above with reference to the accompanying drawings, those skilled in the art should understand that various modifications can also be made to the various embodiments described in the present disclosure, not departing from the contents of the present disclosure. Therefore, the scope of the present disclosure should be determined by the contents of the following claims.

What is claimed is:

1. A method implemented on an Android system using a GPU for rendering a Canvas element, comprising:
   after a rendering operation instruction for a Canvas element in an HTML5 web page is detected, determining whether an initialization operation has been completed for the Canvas element;
   when it is determined that the initialization operation has not been completed, performing the initialization operation for the Canvas element, the initialization operation comprising: creating an off-screen local window for the Canvas element based on attribute information of the Canvas element, and creating an EGL Window Surface and an EGL Context based on the off-screen local window;
   after the rendering operation instruction for the Canvas element in the HTML5 web page is detected and the initialization operation is completed, converting an invoking instruction for a 2D Canvas drawing API into an invoking instruction for an OpenGL ES API through a Skia GPU function library;
   setting the EGL Context as a current context of a thread where a rendering operation is located;
   rendering the Canvas element in the off-screen local window by using the GPU in accordance with the attribute information of the Canvas element; and
   copying the rendered Canvas element to a current active window of a device from the off-screen local window by using a mapping operation function of the GPU.

2. The method of claim 1, wherein the converting an invoking instruction for a 2D Canvas drawing API into an invoking instruction for an OpenGL ES API through a Skia GPU function library comprises:
   packaging the EGL Window Surface created in the off-screen local window as a SkGpuDevice;
   creating a SkCanvas based on the SkGpuDevice; and
   converting the invoking instruction for a 2D Canvas drawing API into the invoking instruction for the OpenGL ES API by using the SkCanvas.

3. The method of claim 1, wherein the copying the rendered Canvas element to a current active window of a device from the off-screen local window by using a mapping operation function of the GPU comprises:
   after rendering of the Canvas element in the off-screen local window is completed, binding the off-screen local window to OpenGL mapping; and
   copying the rendered Canvas element from the off-screen local window to the current active window of the device.

4. The method of claim 3, wherein the offscreen local window is bound to the OpenGL mapping after a window update request is received, and the window update request is sent after a browser rendering engine detects that web page content changes.

5. The method of claim 1, further comprising acquiring the attribute information of the Canvas element from a rendering engine, wherein the attribute information at least comprises the size and position of the Canvas element.

6. An apparatus for rendering a Canvas element on an Android system using GPU comprising:
   a checking unit that, after a rendering operation instruction for a Canvas element in an HTML5 web page is detected, determines whether an initialization operation has been completed for the Canvas element;
   an initialization unit that, when the checking unit determines that the initialization operation has not been completed, performs the initialization operation, which comprises creating an off-screen local window for the Canvas element based on attribute information of the Canvas element and creating an EGL Window Surface and an EGL Context based on the off-screen local window;
   a conversion unit that, after the rendering operation instruction for the Canvas element in the HTML5 web page is detected and the initialization unit completes the initialization operation, converts an invoking instruction for a 2D Canvas drawing API into an invoking instruction for an OpenGL ES API through a Skia GPU function library;
   a setting unit that sets the EGL Context created during the initialization operation as a current context of a thread where a rendering operation is located;
   a rendering unit that renders the Canvas element in the off-screen local window created during the initialization operation by using the GPU in accordance with the attribute information of the Canvas element; and
   a copying unit that copies the rendered Canvas element to a current active window of a device from the off-screen local window by using a mapping operation function of the GPU.

7. The apparatus of claim 6, wherein the conversion unit comprises:
   a packaging module that packages the EGL Window Surface created in the off-screen local window as a SkGpuDevice;
   a creation module that creates a SkCanvas based on the SkGpuDevice; and
   a conversion module that converts the invoking instruction for a 2D Canvas drawing API into the invoking instruction for the OpenGL ES API by using the SkCanvas.

8. The apparatus of claim 6, wherein the copying unit comprises:
   a binding module that, after rendering of the Canvas element in the off-screen local window is completed, binds the off-screen local window to OpenGL mapping; and
   a mapping module that copies the rendered Canvas element from the offscreen local window to the current active window of the device through a mapping operation.

9. The apparatus of claim 8, wherein the binding module is configured to, after a window update request is received, bind the off-screen local window to the OpenGL mapping, the window update request being sent after a browser rendering engine detects that web page content changes.

10. A non-transitory computer-readable medium having processor-executable program codes, wherein the program codes cause a processor to execute the following steps of:
   after a rendering operation instruction for a Canvas element in an HTML5 web page is detected, determining whether an initialization operation has been completed for the Canvas element;
   when it is determined that the initialization operation has not been completed, performing the initialization operation for the Canvas element, the initialization operation comprising: creating an off-screen local window for the Canvas element based on attribute information of the Canvas element, and creating an EGL Window Surface and an EGL Context based on the off-screen local window;
   after the rendering operation instruction for the Canvas element in the HTML5 web page is detected and the initialization operation is completed, converting an invoking instruction for a 2D Canvas drawing API into an invoking instruction for an OpenGL ES API through a Skia GPU function library;
   setting the EGL Context created during the initialization operation as a current context of a thread where the rendering operation is located;
   rendering the Canvas element in the off-screen local window created during the initialization operation by using a GPU in accordance with the attribute information of the Canvas element; and
   copying the rendered Canvas element to a current active window of a device from the off-screen local window by using a mapping operation function of the GPU.

11. A method for rendering a Canvas element, comprising:
   after detecting a rendering operation instruction for an Canvas element in an HTML5 web page, determining whether an initialization operation has been completed;
   when it is determined that the initialization operation has not been completed, performing an initialization operation, comprising creating an off-screen local window for the Canvas element based on attribute information of the Canvas element;
   rendering the Canvas element in the off-screen local window by using a GPU in accordance with the attribute information of the Canvas element; and
   copying the rendered Canvas element to a current active window of a device from the off-screen local window by using a mapping operation function of the GPU.

12. The method of claim 11, wherein the initialization operation further comprises
   creating an EGL Window Surface and an EGL Context based on the offscreen local window.

13. The method of claim 12, further comprising:
   setting the EGL Context as a current context of a thread where the rendering operation is located.

14. The method of claim 13, further comprising:
   converting an invoking instruction for a 2D Canvas drawing API into an invoking instruction for an OpenGL ES API through a Skia GPU function library.

15. The method of claim 14, further comprising:
   packaging the EGL Window Surface created in the off-screen local window as a SkGpuDevice;
   creating a SkCanvas based on the SkGpuDevice; and
   converting the invoking instruction for a 2D Canvas drawing API into the invoking instruction for the OpenGL ES API by using the SkCanvas.

16. The method of claim 11, further comprising:
   binding the off-screen local window to OpenGL mapping after rendering of the Canvas element in the off-screen local window is completed; and then copying the rendered Canvas element from the off-screen local window to the current active window of the device.

17. The method of claim 16, further comprising
receiving a window update request before binding the off-screen local window to the OpenGL mapping, the window update request being sent after a browser rendering engine detects that web page content changes.

18. The method of claim 11, further comprising
acquiring the attribute information of the Canvas element from a rendering engine, wherein the attribute information at least comprises the size and position of the Canvas element.

19. A non-transitory computer-readable medium storing instructions that, when executed by a computer, cause the computer to perform operations to render a Canvas element, comprising:
   after detecting a rendering operation instruction for an Canvas element in an HTML5 web page, determining whether an initialization operation has been completed;
   when it is determined that the initialization operation has not been completed, performing an initialization operation, comprising creating an off-screen local window for the Canvas element based on attribute information of the Canvas element, and creating an EGL Window Surface and an EGL Context based on the off-screen local window;
   rendering the Canvas element in the off-screen local window by using a GPU in accordance with the attribute information of the Canvas element; and
   copying the rendered Canvas element to a current active window of a device from the off-screen local window by using a mapping operation function of the GPU.

20. A method implemented on an Android system using a GPU for rendering a Canvas element, comprising:
   performing an initialization operation for a Canvas element, the initialization operation comprising: creating an off-screen local window for the Canvas element based on attribute information of the Canvas element, and creating an EGL Window Surface and an EGL Context based on the off-screen local window;
   after a rendering operation instruction for the Canvas element in an HTML5 web page is detected and the initialization operation is completed, converting an invoking instruction for a 2D Canvas drawing API into an invoking instruction for an OpenGL ES API through a Skia GPU function library;
   setting the EGL Context as a current context of a thread where a rendering operation is located;
   rendering the Canvas element in the off-screen local window by using the GPU in accordance with the attribute information of the Canvas element; and
   copying the rendered Canvas element to a current active window of a device from the off-screen local window by using a mapping operation function of the GPU,
   wherein the converting an invoking instruction for a 2D Canvas drawing API into an invoking instruction for an OpenGL ES API through a Skia GPU function library comprises:
   packaging the EGL Window Surface created in the off-screen local window as a SkGpuDevice;
   creating a SkCanvas based on the SkGpuDevice; and
   converting the invoking instruction for a 2D Canvas drawing API into the invoking instruction for the OpenGL ES API by using the SkCanvas.

* * * * *